J. SHAW.
Feather-Renovator.
No. 223,298. Patented Jan. 6, 1880.
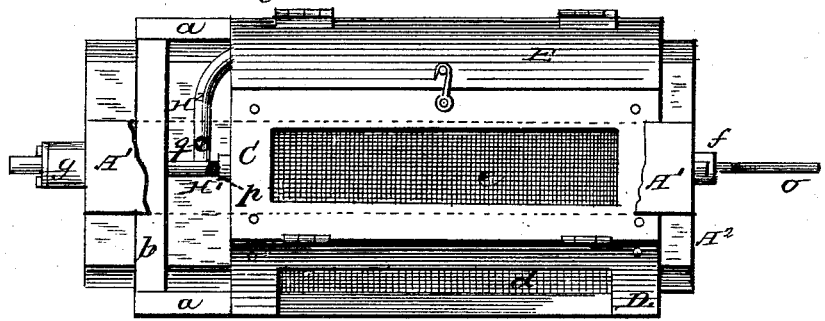
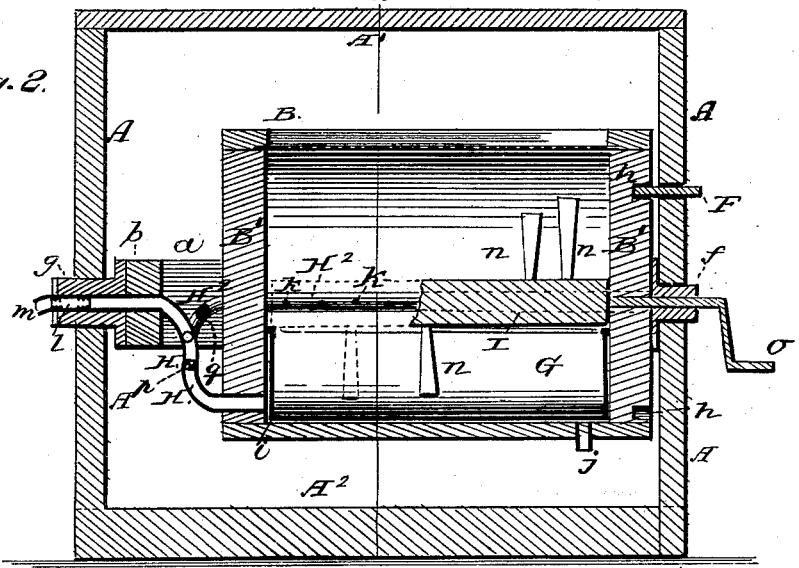
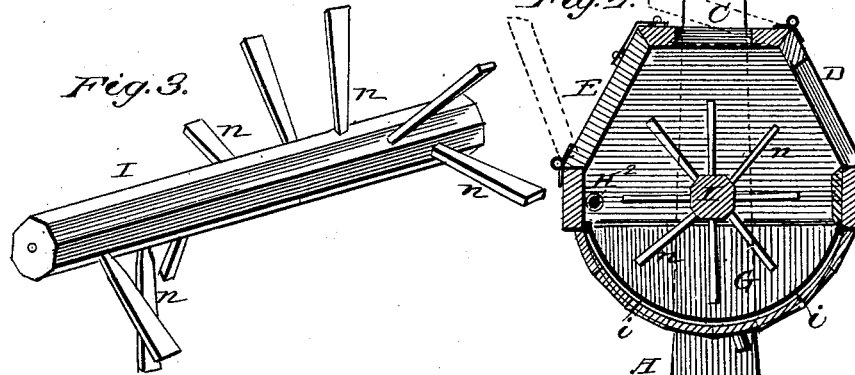
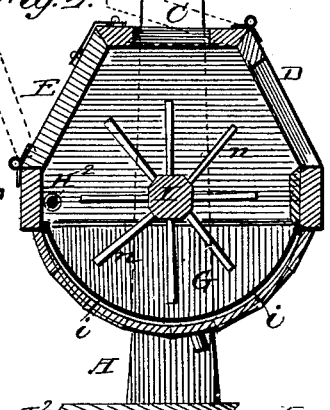
Witnesses
Fred. G. Dietrich
August Peterson
Inventor
John Shaw
by Louis Bagger & Co.
attorneys

UNITED STATES PATENT OFFICE.

JOHN SHAW, OF FRANKLIN, NEW HAMPSHIRE.

FEATHER-RENOVATOR.

SPECIFICATION forming part of Letters Patent No. 223,298, dated January 6, 1880.

Application filed May 12, 1879.

*To all whom it may concern:*

Be it known that I, JOHN SHAW, of Franklin, in the county of Merrimack and State of New Hampshire, have invented certain new and useful Improvements in Feather-Renovators; and I do hereby declare that the following is a full, clear, and exact description of the invention, which will enable others skilled in the art to which it appertains to make and use the same, reference being had to the accompanying drawings, which form a part of this specification, and in which—

Figure 1 is a top view. Fig. 2 is a longitudinal vertical section, the rotary drying-chamber and frame being set at right angles to the position indicated in Fig. 1. Fig. 3 is a perspective view of the stirrer or agitator detached, and Fig. 4 is a transverse vertical section taken on the line indicated by $x\ x$ in Fig. 2.

Similar letters of reference indicate corresponding parts in all the figures.

This invention relates to renovators for feathers, curled hair, upholstery-moss, and similar articles; and it consists in an improved construction and arrangement of parts, substantially as hereinafter more fully set forth.

In the drawings, A A are the end pieces or uprights, and A' the cross-beam, of a stout frame, secured in a sill, A². Within this frame is hung the renovator B, which may be cylindrical in shape or consist of a semi-cylinder, as shown in the drawings, the two upper sides or edges of which are extended to form arms $a\ a$, which are united by a cross-piece, $b$. The top or cover of the semi-cylinder consists of two hinged sections, C D, and a panel, E, the sections C and D consisting each of a frame, upon which is suspended a piece of wire-cloth or perforated sheet metal, $e\ d$.

Secured centrally in one of the heads B' of the renovator is a tubular pivot or sleeve, $f$, which is journaled in the adjacent upright A, and the cross-piece $b$ at the other end of the renovator is provided with a similar sleeve, $g$, which is journaled in the opposite upright A, so that the renovator may be rotated freely within its frame A A A' A². One of the heads B' has a series of circumferential perforations or indentations, $h\ h$, into which will fit one end of a retaining-pin, F, inserted through a hole in the upright A next to the said head B', and it follows that the renovator may be tilted or partially rotated in its bearings, and held in any given position by inserting pin F into one of the perforations $h$.

The lower or semi-cylindrical part of the renovator has a false bottom, G, made preferably of sheet metal, which forms, with the bottom of the renovator, a steam-chamber, $i$, provided with an outlet, $j$, in its bottom, and with a steam-pipe, H', which forms one part of a branched pipe, H, the other branch or section of which, H², passes longitudinally through the cylinder along the upper edge of the steam-chamber $i$, and is provided with a series of perforations, $k$. Pipe H is inserted through the tubular journal $g$, where it is connected by a swivel or coupling, $l$, to a pipe, $m$, leading to the boiler.

The agitator or stirrer consists of a central shaft, I, journaled in each of the heads of the renovator, and provided with a series of spirally-arranged beaters, $n$. It is operated by a crank, $o$, one end of which is inserted through the tubular journal $f$.

From the foregoing description, taken in connection with the drawings, the operation of my improved feather-renovator will be readily understood. The feathers or other substance to be cleaned are placed into the renovator through the hinged doors C D, the renovator meanwhile being kept in the proper position by inserting the retaining-pin F into one of the upper recesses, $h$, in the head B'. Steam is then turned on by opening the steam-cock $p$ in pipe H' and closing cock $q$ in pipe H², and the feathers are thoroughly stirred by rotating the agitator I $n$. After a while the position of the renovator is reversed in its bearings, so as to bring the screen-doors lowermost, and by continuing the agitation of the feathers while the renovator is in this position the dirt and impurities are sifted out, the sections C D acting as sieves to separate the feathers from the dirt. The renovator is then again replaced in its former position, and steam is turned off from pipe H' and passed into the steam-chamber $i$. After the feathers have been dried in this manner the hinged upper sections of the renovator are thrown open, and by a brisk turn of the agitator the feathers are blown out upon the floor, where they are left to dry thoroughly, after which they are ready for packing.

Having thus described my invention, I claim and desire to secure by Letters Patent of the United States—

The improved feather-renovator herein described, consisting of the vertical supporting-frame A A' A, provided with the retaining-pin F, rotary renovator B, having recesses $h\,h$, steam-chamber $i$, and screen-sections C D, agitator I $n$, branched pipe H H' H$^2$, and tubular journals $f\,g$, all constructed and combined to operate substantially in the manner and for the purpose herein shown and described.

In testimony that I claim the foregoing as my own I have hereto affixed my signature in presence of two witnesses.

JOHN SHAW.

Witnesses:
DANIEL BARNARD,
W. E. ROGERS.